(12) United States Patent
Lin et al.

(10) Patent No.: US 7,270,702 B1
(45) Date of Patent: Sep. 18, 2007

(54) YELLOW DYE COMPOUND AND THE INK COMPOSITION THEREOF

(75) Inventors: Wen-Chin Lin, Taoyuan County (TW);
Tzu-Kwei Sun, Taoyuan County (TW);
Jen-Fang Lin, Taoyuan County (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 11/452,909

(22) Filed: Jun. 15, 2006

(30) Foreign Application Priority Data

Dec. 30, 2005 (CN) .................... 2005 1 0137591

(51) Int. Cl.
*C09D 11/00* (2006.01)
*C09B 29/036* (2006.01)
*C09B 67/22* (2006.01)

(52) U.S. Cl. .................. 106/31.48; 534/772; 8/641

(58) Field of Classification Search ............ 106/31.48; 534/772; 8/641
See application file for complete search history.

(56) References Cited

U.S. PATENT DOCUMENTS

| | | | |
|---|---|---|---|
| 3,945,990 A | | 3/1976 | Ikeda et al. .................. 260/153 |
| 4,017,477 A * | | 4/1977 | Hegar et al. ................. 534/709 |
| 4,039,523 A * | | 8/1977 | Hegar ........................... 534/635 |
| 4,067,864 A * | | 1/1978 | Oesterlein et al. .......... 534/635 |
| 4,092,308 A * | | 5/1978 | Hegar ........................... 534/634 |
| 5,391,716 A * | | 2/1995 | Bootz et al. ................. 534/635 |
| 6,007,611 A * | | 12/1999 | Mheidle et al. ........... 106/31.47 |
| 6,042,621 A * | | 3/2000 | Wald et al. ...................... 8/549 |
| 6,500,246 B2 * | | 12/2002 | Huang et al. ............. 106/31.27 |
| 6,723,835 B1 * | | 4/2004 | Millard et al. .............. 534/772 |
| 2003/0136301 A1 * | | 7/2003 | Shawcross et al. ...... 106/31.48 |
| 2003/0183123 A1 * | | 10/2003 | Wald ........................ 106/31.48 |
| 2005/0174410 A1 * | | 8/2005 | Hasemann et al. ......... 347/100 |

FOREIGN PATENT DOCUMENTS

JP     55-36208     3/1980

* cited by examiner

*Primary Examiner*—Helene Klemanski
(74) *Attorney, Agent, or Firm*—Bacon & Thomas, PLLC

(57) ABSTRACT

The present invention discloses a yellow dye compound having a structure of the following formula (I):

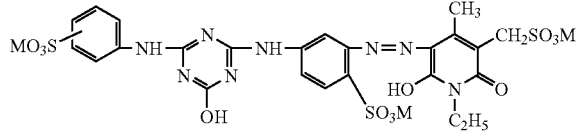

wherein M is H, Li, $NH_4$ or Na. The dye compound of the present invention is particularly applied to yellow dye compound for paper-printing ink jet ink and can be made into yellow ink jet ink with greenish yellow, wide color gamut, and excellent solubility.

17 Claims, No Drawings

YELLOW DYE COMPOUND AND THE INK COMPOSITION THEREOF

BACKGROUND OF THE INVENTION

1. Field of the Invention

The present invention relates to a yellow dye compound, and more particularly relates to a yellow dye compound especially applied to ink jet ink for paper printing, which can be made into yellow ink jet ink with greenish yellow, wide color gamut, and excellent solubility.

2. Description of the Related Art

The conventional C.I. Reactive Yellow 95 is used in cellulose fiber dyeing. The present invention modifies the structure of C.I. Reactive Yellow 95 and then applies it to the yellow dye compound for paper-printing ink jet ink and improves the solubility of the dye compound. Besides, the usually used yellow ink composition, such as C.I. Direct Yellow 86 with reddish yellow and C.I. Acid Yellow 23 with greenish yellow, are not bright and chromatic enough.

Therefore, among the dye compounds of ink jet ink, a dye compound is in demand in purpose of making a yellow ink jet ink with greenish yellow, wide color gamut, excellent solubility and good storage stability.

SUMMARY OF THE INVENTION

The present invention provides a novel yellow dye compound that is applied to the yellow dye compound for paper-printing ink jet ink. The yellow dye compound of the present invention can produce a yellow dye composition and further make a yellow ink jet ink with greenish yellow, wide color gamut, and excellent solubility.

The yellow dye compound of the present invention has a structure of the following formula (I):

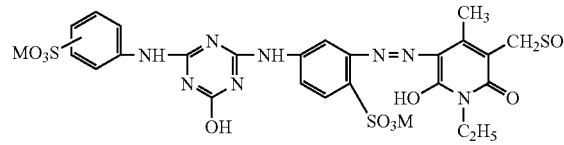

(I)

wherein, M is H, Li, $NH_4$ or Na.

Preferably, the yellow dye compound of the present invention is the following formula (I-1):

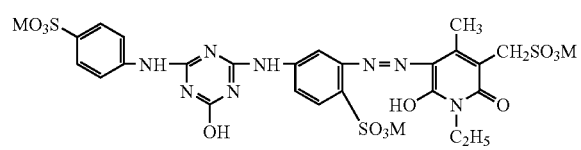

(I-1)

or the following formula (I-2):

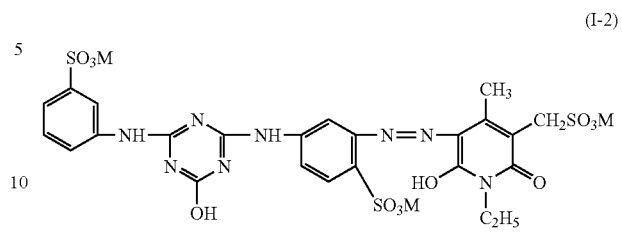

(I-2)

wherein, M is H, Li, $NH_4$ or Na.

The formula (I-1) compound is preferable as the following formula (I-1a) compound:

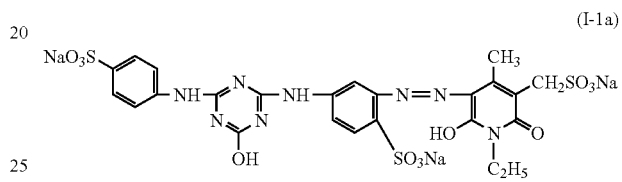

(I-1a)

The formula (I-2) compound is preferable as the following formula (I-2a) compound:

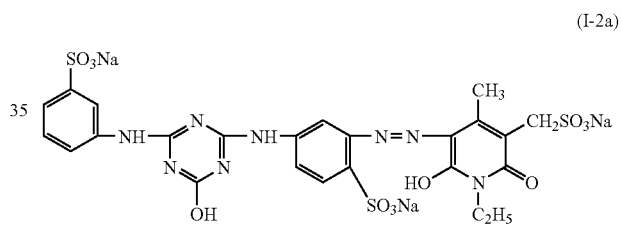

(I-2a)

The yellow dye compound of formula (I) of the present invention can be used singly as a yellow dye or be mixed with several yellow dye compounds to form a yellow dye composition.

The yellow dye composition of the present invention comprises the following formula (I-1) compound and formula (I-2) compound:

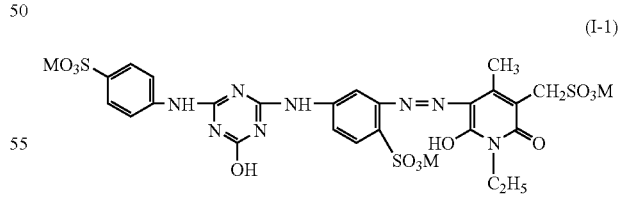

(I-1)

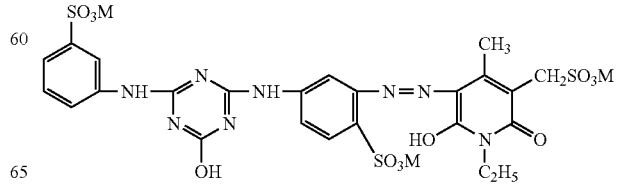

(I-2)

wherein, M is H, Li, $NH_4$ or Na. The yellow dye composition of the present invention improves the solubility; that is to say, when a yellow ink composition is made from the composition of formula (I-1) compound and formula (I-2) compound, its solubility is surprisingly improved.

Preferably, the formula (I-1) compound of the yellow dye composition of the present invention is as the following formula (I-1a), and the formula (I-2) compound is as the following formula (I-2a):

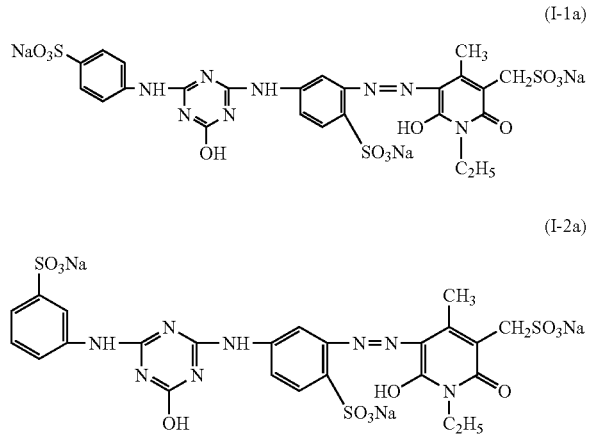

The composition ratio of the yellow dye composition of the present invention is not especially limited. The ratio of formula (I-1) compound can be 1% to 99% by weight, and the ratio of formula (I-2) compound can be 99% to 1% by weight. Preferably, the ratio of formula (I-1) is 10% to 90% by weight, and the ratio of formula (I-2) is 90% to 10% by weight. More preferably, the ratio of formula (I-1) is 30% to 70% by weight, and the ratio of formula (I-2) is 70% to 30% by weight. The best ratio of formula (I-1) compound and formula (I-2) compound is 50% by weight.

The yellow dye compound or the yellow dye composition of the present invention can further make into yellow ink composition.

The yellow ink composition made from the yellow dye compound of the present invention comprises:

(A) 1-40% by weight of the yellow dye compound of the following formula (I):

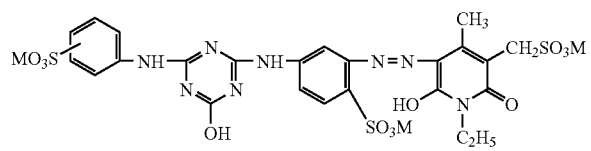

wherein, M is H, Li, $NH_4$ or Na;

(B) 20-30% by weight of organic solvent; and (C) 55-70% by weight of water.

The yellow dye composition of the present invention can also be taken as the component of yellow dye and form a yellow ink composition. The yellow ink composition made from the yellow dye composition of the present invention comprises:

(A) 1-40% by weight of the yellow dye composition including the following formula (I-1) compound and formula (I-2) compound:

wherein, M is H, Li, $NH_4$ or Na;

(B) 20-30% by weight of organic solvent; and (C) 55-70% by weight of water.

In the yellow ink composition of the present invention, the organic solvent is selected from the group consisting of ethylene glycol, diethylene glycol, triethylene glycol, propylene glycol, butylene glycol, ethylene glycol monoethyl ether, ethylene glycol monobutyl ether, diethylene glycol monoethyl ether, 2-pyrrolidinone, N-methyl-2-pyrrolidinone, 1,3-Dimethyl-2-Imidazolidinone, and triethanolamine.

The yellow ink composition of the present invention can be further comprised of component (D): 0.001-5% by weight of surfactant as the following formula:

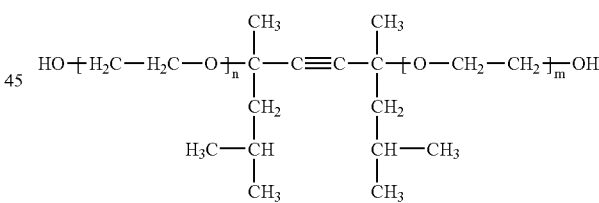

wherein the sum of n and m is integer between 0 and 50.

The formula (I) of yellow dye compound described in component (A) of the yellow ink composition of the present invention is preferable as the following formula (I-1a):

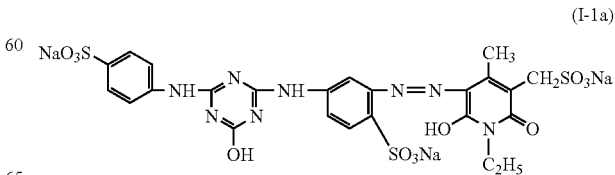

or as the following formula (I-2a):

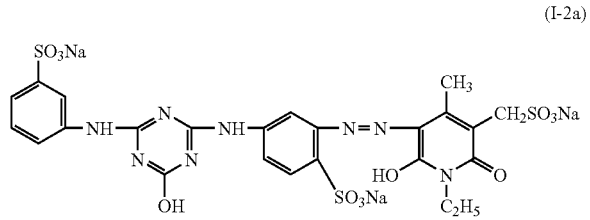

(I-2a)

DETAILED DESCRIPTION OF THE PREFERRED EMBODIMENT

The preparation of the formula (I) yellow dye compound of the present invention comprises steps: (a) dispersing the cyanuric chloride compound; (b) adding dissolved 4-aminobenzenesulfonic acid or 3-aminobenzenesulfonic acid to perform a condensation reaction; (c) adding dissolved 2,4-diaminobenzenesulfonic acid or the salt solution thereof to perform the second condensation reaction; (d) putting the condensed product into sodium nitride and hydrochloric acid solution to perform a diazotization reaction and obtain the diazotized salt solution; (e) proceeding the coupling reaction with the diazotized salt solution with 1-ethyl-3-sulphomethyl-4-methyl-6-hydroxy-pyridone-2 or the salt thereof to form a second coupled compound; (f) adjusting the pH value of the second coupled compound with sodium hydroxide solution; (g) heating the solution to perform hydrolysis reaction and adjusting the pH value to neutrality with hydrochloric acid solution; (h) after the hydrolysis reaction is completed, proceed to desalinate and condense by reverse osmosis filtration; and (i) spray dry the filtered solution to obtain the yellow dye compound of the following formula (I'):

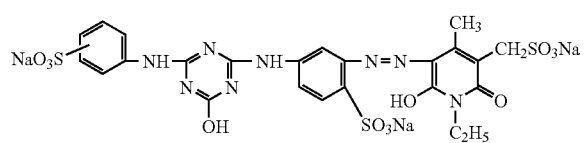

(I')

The yellow dye compound of formula (I') can be converted into the yellow dye compound of the following formula (I) with any conventional method:

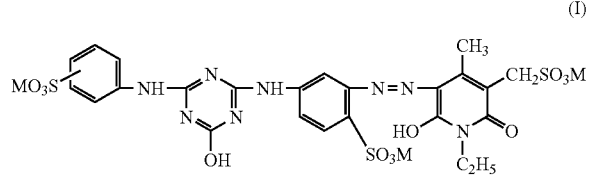

(I)

wherein, M is H, Li, $NH_4$ or Na.

The yellow ink composition of the present invention, comprising: (A) 1-40% by weight of the yellow dye compound as above-described formula (I); (B) 20-30% by weight of organic solvent; and (C) 55-70% by weight of deionized water. The components and ratio of the yellow ink composition of the present invention has been described in detail above.

The yellow ink composition of the present invention can be further comprised of component (D): surfactant. The surfactant is selected from the group consisting of acetylene glycol derivatives, such as Surfynol 465, Surfynol 485, Surfynol 420, and Surfynol 104 (sold by Air Products & Chemicals), having general formula of chemical structure as follows:

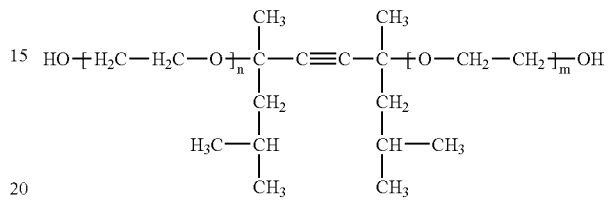

wherein the sum of n and m is integer between 0 and 50.

Hereinafter, preferred embodiments of formula (I) yellow dye compound and yellow ink composition of the present invention will be described in detail. The description proposed herein is just a preferable example for the purpose of illustrations only, not intended to limit the scope of the invention. For example, the compound is described in the form of free acid, however, it may actually be metal salt or alkaline metal salt, especially sodium salt. Unless otherwise specified, the parts or percentage mentioned in the embodiments are measured by weight and the temperature is measured by centigrade degrees (° C.).

EXAMPLE 1

Preparation for Formula (I-1a) Yellow Dye Compound

Stir and disperse 9.5 kg of cyanuric chloride in 30 L of water and 9 kg of ice. After the solution is evenly dispersed, add a solution of 8.5 kg 4-aminobenzenesulfonic acid dissolved in 30 L of water and 3 L of 45% sodium hydroxide to proceed a condensation reaction, keeping the temperature between 5~10° C., pH 2~2.5. After the reaction reaches completion, add 9 kg of powdered 2,4-diaminobenzenesulfonic acid to proceed the second condensation reaction, keeping the temperature between 20~40° C., pH 5~7. Add to the condensation reaction product 3.6 kg of sodium nitride and 20 L of 32% hydrochloric acid solution, and then add ice to lower the temperature to 5~15° C. to perform the diazotization reaction till the reaction completes. Perform a coupling reaction with the diazotized salt solution and a solution of 11 kg 1-ethyl-3-sulphomethyl-4-methyl-6-hydroxy-pyridone-2 dissolved in 30 L of water and 2 L of 45% sodium hydroxide solution, keeping the temperature between 5~15° C., pH 7~8 till the coupling reaction completes. Adjust the pH to 10~12 with 45% sodium hydroxide solution. Heat the solution up to 85° C. and keep reacting under constant temperature for 90 minutes. Adjust the pH to 7~7.5 with 32% hydrochloric acid solution and then proceed to desalinate and concentrate the solution using reverse osmosis filtration. After the filtration process is complete, spray dry the filtrate to obtain 15 kg of powdered yellow dye compound having a structure of the above-mentioned formula (I-1a), abs./λ max=370/420 nm, 10 ppm.

EXAMPLE 2

Preparation of Formula (I-2a) Yellow Dye Compound

Stir and disperse 9.5 kg of cyanuric chloride in 30 L of water and 9 kg of ice. After the solution is evenly dispersed, add a solution of 8.5 kg 3-aminobenzenesulfonic acid dissolved in 30 L of water and 3 L of 45% sodium hydroxide to proceed a condensation reaction keeping the temperature between 5~10° C., pH 2~2.5. After the reaction completes, add 9 kg of powdered 2,4-diaminobenzenesulfonic acid to proceed the second condensation reaction and keep the temperature between 20~40° C., pH 5~7 till the reaction ends. Add to the condensation reaction product 3.6 kg of sodium nitride and 20 L of 32% hydrochloric acid solution then add ice to lower the temperature to 5~15° C. to perform the diazotization reaction till the reaction ends. Proceed a coupling reaction with the diazotized salt solution and solution of 11 kg 1-ethyl-3-sulphomethyl-4-methyl-6-hydroxy-pyridone-2 dissolved in 30 L of water and 2 L of 45% sodium hydroxide solution, keeping the temperature between 5~15° C., pH 7~8 till the coupling reaction completes. Adjust the pH value to 10~12 with 45% sodium hydroxide solution. Heat the solution up to 85° C. and keep reacting under constant temperature for 90 minutes. Adjust the pH to 7~7.5 with 32% hydrochloric acid solution and then proceed to desalinate and concentrate the solution using reverse osmosis filtration. After the filtration process is finished, spray and dry the filtrate to obtain 15 kg of powdered yellow dye compound having a structure of the above-mentioned formula (I-2a), abs./λ max=371/422 nm, 10 ppm.

EXAMPLE 3

Preparation of Yellow Ink Composition

Add 2 g of the yellow dye compound of formula (I-1a) prepared in Example 1 into 69.7 g of deionized water and then in the following sequence, add 10 g of diethylene glycol, 10 g of diethylene glycol mono-butyl ether, 7 g of glycerol, 1 g of surfactant and 0.3 g of bactericide into the solution. Mix the solution evenly, adjust the pH value to 7~7.5, and filter the solution to obtain the yellow ink composition.

EXAMPLE 4

Preparation of Yellow Ink Composition

Add 2 g of the yellow dye compound of formula (I-2a) into 69.7 g of deionized water and then in the following sequence, add 10 g of diethylene glycol, 10 g of diethylene glycol mono-butyl ether, 7 g of glycerol, 1 g of surfactant and 0.3 g of bactericide into the solution. Mix the solution evenly, adjust the pH value to 7~7.5, and filter the solution to obtain the yellow ink composition.

EXAMPLE 5

Add 2 g of yellow dye mixture of the formula (I-1a) compound and formula (I-2a) compound in a ratio of 1:1 into 69.7 g of deionized water and then in the following sequence, add 10 g of diethylene glycol, 10 g of diethylene glycol mono-butyl ether, 7 g of glycerol, 1 g of surfactant and 0.3 g of bactericide into the solution. Mix the solution evenly, adjust the pH value to 7~7.5, and filter the solution to obtain the yellow ink composition.

Conventional Method for Preparing Yellow Ink Composition

COMPARATIVE EXAMPLE 1

Take 2 g of C.I. Direct Yellow 132 dye compound add into 69.7 g of deionized water and then in the following sequence, add 10 g of diethylene glycol, 10 g of diethylene glycol mono-butyl ether, 7 g of glycerol, 1 g of surfactant and 0.3 g of bactericide into the solution. Mix the solution evenly, adjust the pH value to 7~7.5, and filter the solution to obtain the yellow ink composition.

COMPARATIVE EXAMPLE 2

Add 2 g of C.I. Acid Yellow 23 dye compound into 69.7 g of deionized water and then in the following sequence, add 10 g of diethylene glycol, 10 g of diethylene glycol mono-butyl ether, 7 g of glycerol, 1 g of surfactant and 0.3 g of bactericide into the solution. Mix the solution evenly, adjust the pH value to 7~7.5, and filter the solution to obtain the yellow ink composition.

COMPARATIVE EXAMPLE 3

Add 2 g of C.I. Direct Yellow 86 dye compound into 69.7 g of deionized water and then add, in sequence, 10 g of diethylene glycol, 10 g of diethylene glycol mono-butyl ether, 7 g of glycerol, 1 g of surfactant and 0.3 g of bactericide into the solution. Mix the solution evenly, adjust the pH value to 7~7.5, and filter the solution to obtain the yellow ink composition.

The above-mentioned surfactant is S-465 sold by Air Products & Chemicals, Inc.; the bactericide is PROXEL-XL2 sold by Bayer Company.

Physical Tests of the Yellow Ink Composition:

1. Test of Hue

Print the above obtained ink composition on a paper and test the reflex rate of the paper with AATCC (American Association of Textile Chemists and Colorists) Test Method 173-1989, CIE (Commission International del'Eclairage) L*a*b* Color Test System, and ICS GAIN Spectrophotometer provided by Gain Associate Inc. with D65 standard light source. Take Comparative Example 1 as standard template and test the value of DL, Da, Db, Dc, and Dh respectively.

When the Dh value is positive, the substance is greenish. The larger the positive value is, the larger the degree of greenishness. On the contrary, while Dh value is negative, the substance is reddish. The larger the negative value is, the larger the degree of reddishness. When DL value is positive, the substance is bright. The larger the positive value is, the brighter the substance is. On the contrary, while DL value is negative, the substance is dark. The larger the negative value is, the darker the substance is. The larger the Dc value is, the stronger the chroma of the substance.

The test results of CIE L*a*b* are as the following Table 1.

TABLE 1

| | Test Formula: CIE L*a*b*, Dye: 2% | | | | |
|---|---|---|---|---|---|
| Ink Composition | DL | Da | Db | Dc | Dh |
| Comparative Example 1 | standard | standard | standard | standard | standard |

TABLE 1-continued

Test Formula: CIE L*a*b*, Dye: 2%

| Ink Composition | DL | Da | Db | Dc | Dh |
|---|---|---|---|---|---|
| Comparative Example 2 | −1.41D | 5.4 | 14.8 | 15.0 | −3.5R |
| Comparative Example 3 | −2.82D | 7.4 | 9.2 | 9.4 | 6.0R |
| Example 3 | 0.68C | −3.0 | 15.8 | 15.9 | 1.5G |
| Example 4 | 0.73C | −3.2 | 16.3 | 16.4 | 1.7G |
| Example 5 | 0.71C | −3.1 | 16.2 | 16.3 | 1.6G |

Note:
1. standard refers to L* (85.5); a* (−4.3); b* (56.0); c* (56.2); h (94.4)
2. D stands for Dark; C stands for Clear; R stands for Red; G stands for Green Normally, L*a*b* represents the three dimensional space of color:
L*: Lightness (+L* direction is brighter, and −L* direction is darker)
a*: Green/Red coordinate axis, +a* direction is reddish and −a* direction is greenish
b*: Blue/Yellow coordinate axis, +b* direction is yellowish, −b* direction is bluish
DL: Difference Lightness
Da: a* value of comparative template minus the a* value of standard template
Db: b* value of comparative template minus the b* value of standard template
c: chroma
h: hue
Dc: Difference chroma
Dh: Difference hue Observing results of Table 1 above, the Da value of the present invention is negative and the Db value is positive so that a greenish yellow ink jet ink is obtained. Furthermore, when both the DL and Dh value are positive; it shows that the present invention is not only greenish yellow but also bright. Therefore, the present invention can obtain yellow ink jet ink with greenish yellow and wide color gamut.

2. Test of Solubility Under Room Temperature
a. Take fixed amount of X g dried dye. X stands for the soluble concentration (g/L) that each dye needs. For example, while testing solubility of 100 g/L, 100 g of dye and 1 L of water are put into a beaker and are stirred with glass rod till the solution is evenly mixed.
b. Stir on magnet stirrer under the room temperature for 15 minutes.
c. Wet TOYO No. 1 filter paper and ceramic funnel beforehand and extract the air out and filter dry. Pour the testing dye solution to the filter paper and funnel rapidly.
d. Take the filter paper out and dry it naturally and observe the result.

The results of solubility are as the following Table 2:

TABLE 2

Solubility under room temperature:

| Dye in the ink composition | Solubility |
|---|---|
| Comparative Example 1 | 120 g/L |
| Comparative Example 2 | 200 g/L |
| Comparative Example 3 | 150 g/L |
| Example 3 | 140 g/L |
| Example 4 | 140 g/L |
| Example 5 | 300 g/L |

The Table 2 shows that the ink composition of Example 5 of the present invention, whose dye is a mixture of formula (I-1a) compound and formula (I-2a) compound, has the best solubility.

CONCLUSION

| Test Results | Comparative Example 1 | Comparative Example 2 | Comparative Example 3 | Example 5 |
|---|---|---|---|---|
| Color Gamut | ○ | Δ | ▼ | ⊙ |
| Solubility | ▼ | Δ | ▼ | ⊙ |

Note: ⊙ excellent; ○ good; Δ acceptable; ▼ poor

The table above shows that the ink composition of the example of the present invention has characteristics of greenish yellow color, wide color gamut and excellent solubility.

From the foregoing description, the present invention shows differences from conventional technology in several ways, such as in purpose, method, function, technology, and search and design. Although the present invention has been explained in relation to its preferred examples, it is to be understood that many other possible modifications and variations can be made without departing from the scope of the invention as hereinafter claimed.

What is claimed is:

1. A yellow dye of the following formula (I) compound:

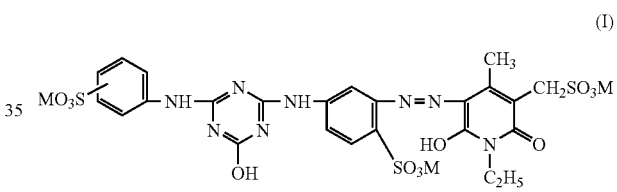

(I)

wherein, M is H, Li, $NH_4$ or Na.

2. The yellow dye of claim 1, wherein said formula (I) compound is the following formula (I-1) compound:

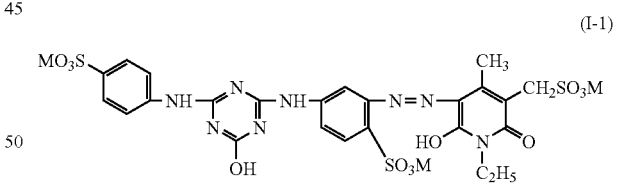

(I-1)

wherein, M is H, Li, $NH_4$ or Na.

3. The yellow dye of claim 2, wherein said formula (I-1) compound is the following formula (I-1a) compound:

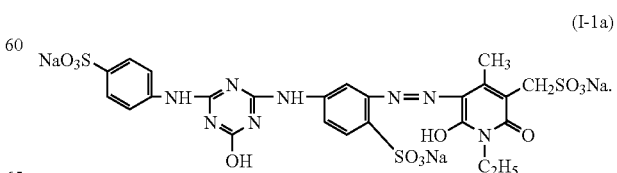

(I-1a)

4. The yellow dye of claim 1, wherein said formula (I) compound is as the following formula (I-2) compound:

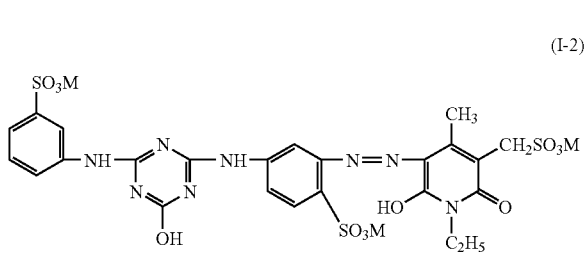

(I-2)

Wherein, M is H, Li, $NH_4$ or Na.

5. The yellow dye of claim 4, wherein said formula (I-2) compound is the following formula (I-2a) compound:

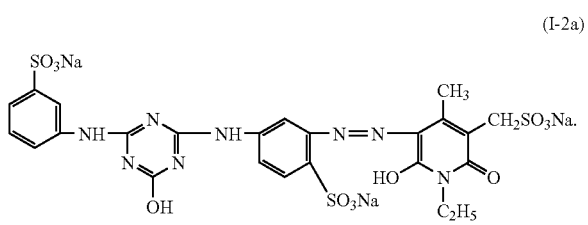

(I-2a)

6. A yellow dye composition, comprising the following formula (I-1) compound and formula (I-2) compound:

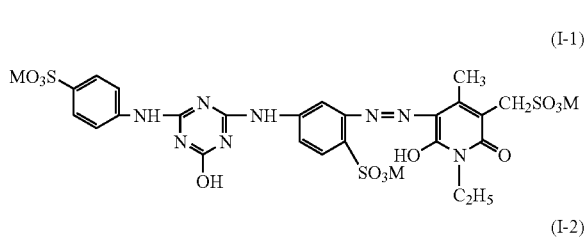

(I-1)

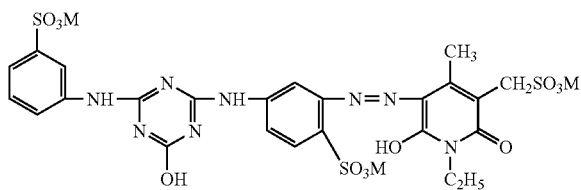

(I-2)

wherein, M is H, Li, $NH_4$ or Na.

7. The yellow dye composition of claim 6, wherein said formula (I-1) compound is the following formula (I-1a) compound and said formula (I-2) compound is the following formula (I-2a) compound:

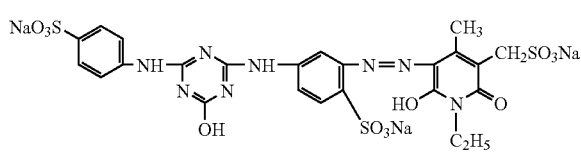

(I-1a)

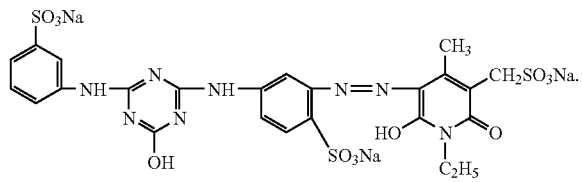

(I-2a)

8. The yellow dye composition of claim 6, wherein the composition ratio of said formula (I-1) compound is 1% to 99% by weight and the composition ratio of said formula (I-2) compound is 99% to 1% by weight.

9. The yellow dye composition of claim 6, wherein the composition ratio of said formula (I-1) compound is 10% to 90% by weight and the composition ratio of said formula (I-2) compound is 90% to 10% by weight.

10. The yellow dye composition of claim 6, wherein the composition ratio of said formula (I-1) compound is 30% to 70% by weight and the composition ratio of said formula (I-2) compound is 70% to 30% by weight.

11. The yellow dye composition of claim 6, wherein the composition ratio of said formula (I-1) compound and said formula (I-2) compound is 50% by weight respectively.

12. A yellow ink composition, comprising:
(A) 1-40% by weight of yellow dye compound of the following formula (I):

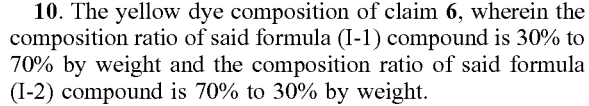

(I)

wherein, M is H, Li, $NH_4$ or Na;
(B) 20-30% by weight of organic solvent; and
(C) 55-70% by weight of water.

13. The yellow ink composition of claim 12, wherein said organic solvent is selected from the group consisting of ethylene glycol, diethylene glycol, triethylene glycol, propylene glycol, butylene glycol, ethylene glycol monoethyl ether, ethylene glycol monobutyl ether, diethylene glycol monoethyl ether, 2-pyrrolidinone, N-methyl-2-pyrrolidinone, 1,3-Dimethyl-2-Imidazolidinone, and triethanolamine.

14. The yellow ink composition of claim 12 further comprising a component (D): 0.001-5% by weight of surfactant as the following formula:

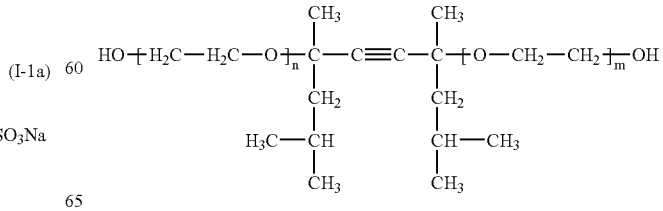

wherein the sum of n and m is integer between 0 and 50.

15. A yellow ink composition, comprising:
(A) 1-40% by weight of said yellow dye composition of claim 6;
(B) 20-30% by weight of organic solvent; and
(C) 55-70% by weight of water.

16. The yellow ink composition of claim 15, wherein said organic solvent is selected from the group consisting of ethylene glycol, diethylene glycol, triethylene glycol, propylene glycol, butylene glycol, ethylene glycol monoethyl ether, ethylene glycol monobutyl ether, diethylene glycol monoethyl ether, 2-pyrrolidinone, N-methyl-2-pyrrolidinone, 1,3-Dimethyl-2-Imidazolidinone, and triethanolamine.

17. The yellow ink composition of claim 15 further comprising a component (D): 0.001-5% by weight of surfactant as the following formula:

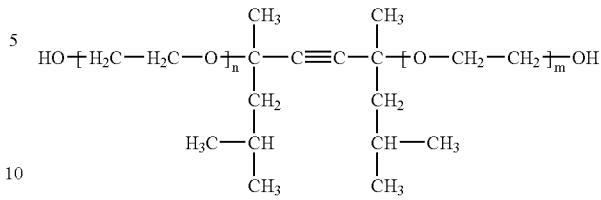

wherein the sum of n and m is integer between 0 and 50.

* * * * *